United States Patent
Das et al.

(10) Patent No.: US 8,005,196 B1
(45) Date of Patent: Aug. 23, 2011

(54) SYSTEMS AND METHODS FOR MULTI-TIERED PRIORITY MESSAGING

(75) Inventors: Sreerupa Das, Arvada, CO (US); Ashis Malty, Arvada, CO (US); John Rishea, Denver, CO (US); Christopher Chu, Lakewood, CO (US)

(73) Assignee: Avaya Inc., Basking Ridge, NJ (US)

( * ) Notice: Subject to any disclaimer, the term of this patent is extended or adjusted under 35 U.S.C. 154(b) by 1301 days.

(21) Appl. No.: 11/469,432

(22) Filed: Aug. 31, 2006

(51) Int. Cl.
*H04M 1/64* (2006.01)
*G06F 15/16* (2006.01)

(52) U.S. Cl. .................................... 379/88.22; 709/206

(58) Field of Classification Search ............... 379/88.04, 379/88.08, 88.11, 88.22, 88.26, 67.1; 370/352; 706/46–47; 709/206, 240
See application file for complete search history.

(56) References Cited

U.S. PATENT DOCUMENTS

| | | | |
|---|---|---|---|
| 5,377,354 A * | 12/1994 | Scannell et al. ............... | 718/103 |
| 6,023,723 A * | 2/2000 | McCormick et al. ......... | 709/206 |
| 6,057,841 A * | 5/2000 | Thurlow et al. ............... | 715/809 |
| 6,233,322 B1 * | 5/2001 | Cannon et al. .............. | 379/93.24 |
| 6,335,962 B1 * | 1/2002 | Ali et al. ..................... | 379/88.11 |
| 6,792,082 B1 * | 9/2004 | Levine ......................... | 379/67.1 |
| 6,826,264 B2 * | 11/2004 | Valco et al. ................... | 379/67.1 |
| 7,027,463 B2 * | 4/2006 | Mathew et al. ............... | 370/463 |
| 7,076,529 B2 * | 7/2006 | Koch et al. .................... | 709/206 |
| 7,194,681 B1 * | 3/2007 | Horvitz ......................... | 715/236 |
| 7,430,548 B2 * | 9/2008 | Huelsman et al. ............. | 706/47 |
| 7,730,142 B2 * | 6/2010 | LeVasseur et al. ............ | 709/206 |
| 2005/0047562 A1 * | 3/2005 | Holz et al. .................. | 379/88.22 |
| 2005/0058261 A1 * | 3/2005 | Baumard ..................... | 379/67.1 |
| 2005/0063365 A1 * | 3/2005 | Mathew et al. ............... | 370/352 |
| 2008/0089255 A1 * | 4/2008 | Graves et al. ................. | 370/310 |

OTHER PUBLICATIONS

Schmeing et al., "Priority Extension for SMTP"; Internet draft; printed from http://ietfreport.isoc.org/idref/draft-schmeing-smpt-priorities/; Aug. 2006; 26 pages.

* cited by examiner

*Primary Examiner* — Davetta W Goins
*Assistant Examiner* — Mohammad Islam
(74) *Attorney, Agent, or Firm* — Sheridan Ross P.C.

(57) ABSTRACT

Various systems and methods for providing and updating electronic communications are disclosed. For example, a system for utilizing multi-tiered messages is disclosed that includes receiving a message that has a message content, a condition and a future control rule exclusively associated with the message. At least the message content is delivered, and upon satisfaction of the condition, the future control rule is applied to the individual message.

20 Claims, 9 Drawing Sheets

SYSTEMS AND METHODS FOR MULTI-TIERED PRIORITY MESSAGING

BACKGROUND OF THE INVENTION

The present invention is related to electronic communications. More particularly, the present invention is related to systems and methods providing multiple tiered priority electronic communications to one or more recipients.

In a typical scenario an email or voice communication is sent to a recipient indicating a desire on the part of the sender that the recipient respond to or perform an action by a certain date. However, often the recipient is out of the office or otherwise unavailable until some time after the prescribed date. Upon returning, the recipient may be bombarded by what appears to be urgent messages that should have been addressed days or even weeks earlier. This is disconcerting for a recipient who is left to wonder if either a response or the requested action is still required. Further, it is disconcerting to the sender of the message as the sender may believe that the message was received by the recipient and that any requested action has been performed. Such a process leads to miscommunication and at times lost opportunities.

In another twist to the aforementioned scenario, the sender may become aware that the recipient is away for some time after sending the initial message. Upon becoming aware, the sender may communicate a subsequent message to the recipient indicating that there is nothing to worry about and that the sender has made alternative arrangements. This approach is very wasteful as it requires the sender to monitor the situation and become aware of the recipient's absence. Further, it requires the recipient to traverse two messages upon their return. In some cases, this can lead to miscommunications and at times to heightened tensions between co-workers or others.

Hence, for at least the aforementioned reasons, there exists a need in the art for advanced systems and methods for providing and updating electronic communications between parties.

BRIEF SUMMARY OF THE INVENTION

The present invention is related to electronic communications. More particularly, the present invention is related to systems and methods providing multiple tiered priority electronic communications to one or more recipients.

Various systems and methods for providing and updating electronic communications are disclosed. As some examples, methods are disclosed that allow for distribution of a message indicated as either low priority or high priority, and subsequent modification of the priority upon satisfaction of a defined event or duration. As another example, a system for utilizing multi-tiered messages is disclosed that includes a computer readable medium with instructions executable by a processor to receive a message that includes a message content, a recipient identification, and an indication of a priority of the message. In addition, the instructions are executable by the processor to receive an indication of another priority, and to receive a condition associated with the indication of the latter priority. The instructions are further executable to receive a future control rule that includes a control associated with the aforementioned condition, and to distribute both the future control rule and the message. In some cases, the future control rule provides for dynamic updating and/or modification of the provided message based at least in part on the aforementioned condition.

In various cases, the computer readable medium further includes instructions executable by the processor to provide the message content and the indication of the first priority at a location identified by the recipient indication. The location may be, but is not limited to, an email address or a voicemail address. In such systems, the instructions are further executable to access the future control rule, to determine that the condition of the latter priority has been satisfied, and to provide the message content and the indication of the second priority to the location identified by the recipient indication. In particular cases, the message content is an audio content and the indication of the initial priority is an audio indication. In such cases, providing the message content and the indication of the initial priority includes playing the audio content and the audio indication. Further, in such cases, providing the message content and the indication of the second priority includes playing the audio content without the audio indication. In other particular cases where the message content is a text (i.e., textual) content and the indication of the first priority is a graphical indication (i.e., a graphical notation), providing the message content and the indication of the first priority may include displaying the text content and the graphical content. Further, in such cases, providing the message content and the indication of the second priority may include displaying the text content without any graphical priority indicator.

In some cases, the computer readable medium is associated with a processor based machine. In such cases, the processor based machine may be, but is not limited to, a recipient terminal, a sender terminal, and a communication control server. Further, in some cases, the condition may be a duration or an event.

In various cases two or more different message contents (i.e., a first content and a second content) are prepared. In such cases, the computer readable medium may include instructions executable by the processor to provide the first message content at a location identified by the recipient indication, access the future control rule, determine that the condition of the second priority is satisfied, and provide the second message content at a location identified by the recipient indication. In some cases, two or more recipient identifications (i.e., a first recipient identification and a second recipient identification) are provided along with the content message. In such cases, the initial priority may be associated with the first recipient. The message further includes an indication of a third priority that is associated with the second recipient. As just one example of using such a system, a message may be provided with the first priority to the first recipient until the condition is satisfied, at which time the second priority is provided in relation to the message with the first recipient and the message is provided to the second recipient with the third priority. In some cases, the third priority is less than the first priority, and in other cases, the third priority is equivalent to the second priority.

Other embodiments of the present invention provide methods for messaging using multi-tiered messages. The methods include receiving a message that has a message content, a condition and a future control rule exclusively associated with the message. At least the message content is delivered, and upon satisfaction of the condition, the future control rule is applied to the individual message.

In some instances of the aforementioned embodiments, the delivered message content indicates a particular priority, and applying the future control rule to the message changes the priority to another priority. In some cases, the two priorities are received contemporaneously. In one particular case, the two priorities are received prior to delivering the message. In some cases, application of the future control rule to the message is done by a recipient terminal, while in other cases it is done by wither a sender terminal or a communication control server.

In various instances of the aforementioned embodiments, the message includes two message contents that may be received contemporaneously. In one particular case, both message contents are received prior to delivering any message content message. In such cases, applying the future control rule to the message causes the second message content to be provided. Providing the second message content may include delivering, displaying and/or playing the second message content. In other instances, a single message content may be tiered for delivery to multiple recipient mailboxes. In such instances, applying the future control rule to the message causes the message content to be delivered to another recipient mailbox.

Yet other embodiments of the present invention provide methods for distributing modifiable messages. The methods include receiving a message with a message content, a recipient identification, and an indication of a first priority. The methods further include receiving an indication of a second priority, and a condition associated with the indication of the second priority. A future control rule is defined, and provides a control associated with the condition. Both the future control rule and the message are distributed. In some cases, the methods further include providing the message content and the indication of the first priority at a location identified by the recipient indication, accessing the future control rule, determining that the condition of the second priority is satisfied, and providing the message content and the indication of the second priority to the location identified by the recipient indication.

In particular cases of the aforementioned embodiments, the message content is an audio content and the indication of the first priority is an audio indication. In such cases, providing the message content and the indication of the first priority includes playing the audio content and the audio indication. In some such cases, the aforementioned audio indication is a first audio indication and the indication of the second priority is a second audio indication. Providing the message content and the indication of the second priority includes playing the audio content and the second audio indication.

In other particular cases of the aforementioned embodiments, the message content is a text content and the indication of the first priority is graphical indication. In such cases, providing the message content and the indication of the first priority includes displaying the text content and the graphical content. Further, providing the message content and the indication of the second priority includes displaying the text content without any graphical priority indicator. In various instances of the aforementioned embodiments, accessing the future control rule includes accessing a location that may be, but is not limited to, the location accessible by the recipient indicated by the recipient indication, a central server, or a location utilized to prepare the message.

Yet further embodiments of the present invention provide methods for messaging (e.g., electronic communications) using multiple priorities and/or multiple recipients. The methods include receiving a message with a message content, a first recipient identification, and a second recipient identification. The methods further include querying for a priority associated with the first recipient identification, and receiving a first priority in response to the query. Further, a query is performed to request a priority associated with the second recipient identification, and a second priority is received in response thereto. The message content is distributed along with the first priority at a location identified by the first recipient identification, and the message content is distributed along with the second priority at a location identified by the second recipient identification.

This summary provides only a general outline of some embodiments according to the present invention. Many other objects, features, advantages and other embodiments of the present invention will become more fully apparent from the following detailed description, the appended claims and the accompanying figures.

BRIEF DESCRIPTION OF THE DRAWING

A further understanding of the various embodiments of the present invention may be realized by reference to the drawing that includes a number of figures that are each described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
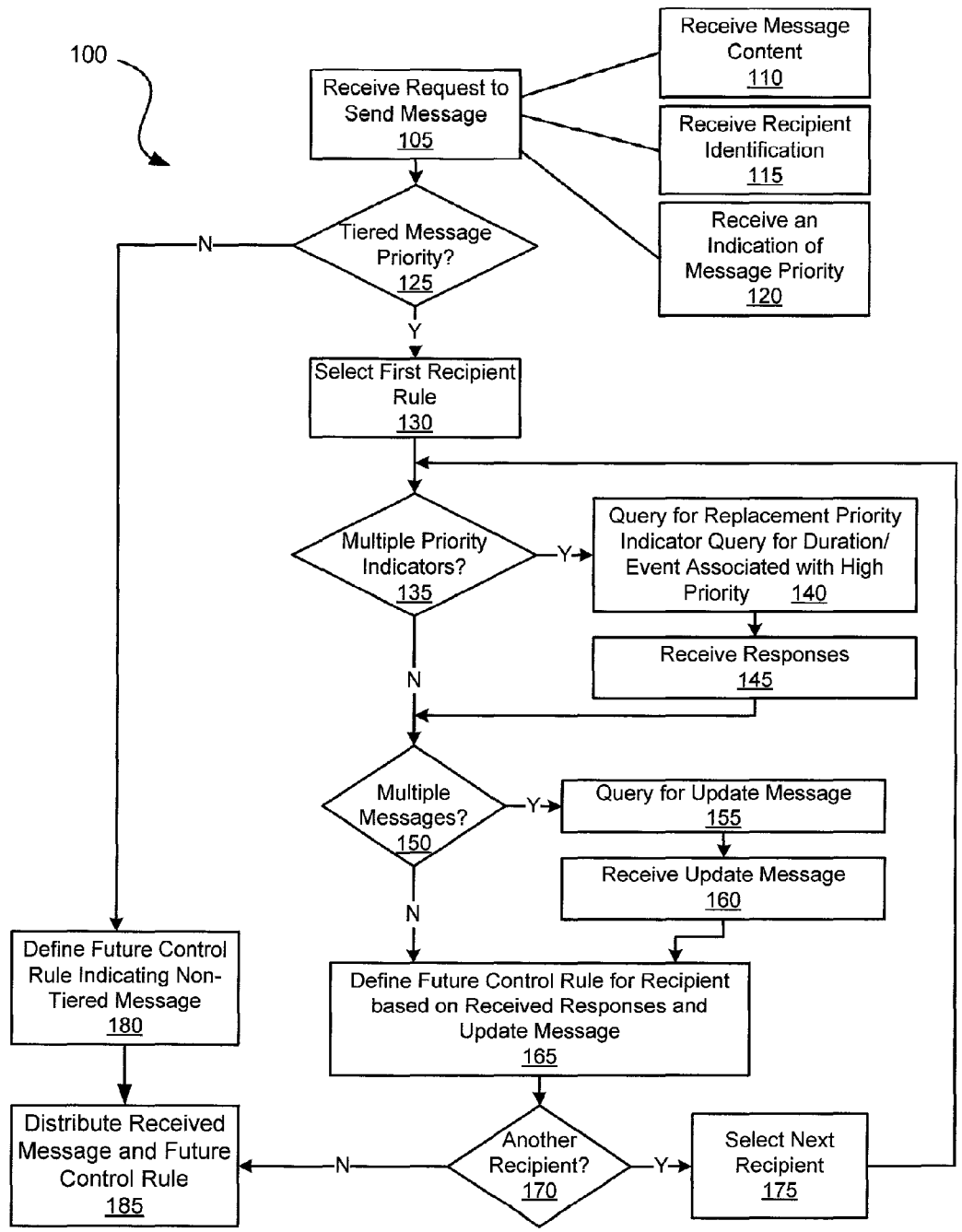
FIG. 1 is a flow diagram illustrating a method for preparing tiered messages in accordance with one or more embodiments of the present invention.

The present invention is related to electronic communications. More particularly, the present invention is related to systems and methods providing multiple tiered electronic communications to one or more recipients.

Various embodiments of the present invention provide systems and methods that allow for distribution of a message indicated as either low priority or high priority, and subsequent modification of the priority upon satisfaction of a defined event or duration. Thus, for example, a message may initially request a recipient's attendance at an event, and after the time of the event has passed, the message may be changed to a non-urgent message indicating that the time for the meeting has passed. In some cases, the message itself may be modified upon satisfaction of the defined event or duration. Thus, for example, a message may initially request a recipient's attendance at an event, and change to inform the recipient that the event occurred after the time of the event has passed. In other cases, multiple recipients may receive the message in a tiered order. Thus, for example, a message requesting a recipient's attendance may be sent to an initial recipient, and where the initial recipient fails to RSVP within a defined period of time, the same message may be sent to the recipient's manager. Based on the disclosure provided herein, one of ordinary skill in the art will recognize a number of other applications of embodiments of the present invention.

Various systems and methods for providing and updating electronic communications are disclosed. As used herein, the phrase "electronic communication" is used in its broadest sense to mean any communication that may be maintained in some electronic form. Thus, for example, an electronic communication may be, but is not limited to, an email or a voicemail. Based on the disclosure provided herein, one of ordinary skill in the art will recognize a variety of electronic communications to which embodiments of the present invention may be applied.

Some embodiments of the present invention provide systems for utilizing multi-tiered messages. Such systems include a computer readable medium with instructions executable by a processor to receive a message that includes a message content, a recipient identification, and an indication of one priority. As used herein, the phrase "computer readable medium" is used in its broadest sense to mean any medium capable of receiving and/or maintaining information accessible to a computer processor. Thus, for example, a computer readable medium may be, but is not limited to, a diskette, a hard disk drive, an optical disk, a CD-ROM, an electrically programmable ROM, a random access memory, combinations thereof, and/or the like. Also as used herein, the phrase "message content" is used in its broadest sense to mean any form of message. Thus, for example, message content may be, but is not limited to, a text message, an audio message or a video message. As used herein, the phrase "recipient identification" is used in its broadest sense to mean any information capable of identifying a recipient. Thus, for example, a recipient identification may be, but is not limited to, an email address, a telephone number, a person's name, combinations of the aforementioned, and/or the like.

The aforementioned instructions are also executable by the processor to receive an indication of another priority, and to receive a condition associated with the indication of the latter priority. As used herein, the term "condition" is used in its broadest sense to mean any identified occurrence that is used to cause a corresponding action. Thus, for example, a condition may be, but is not limited to, the expiration of a time period (i.e., a duration) or the occurrence of an event (e.g., the passing of a particular meeting time or a response from another party). Based on the disclosure provided herein, one of ordinary skill in the art will recognize a myriad of conditions that may be utilized in accordance with one or more embodiments of the present invention.

The aforementioned instructions are further executable to receive a future control rule that includes a control associated with the aforementioned condition, and to distribute both the future control rule and the message. As used herein, the phrases "control rule" or "future control rule" are used in their broadest sense to mean any rule that causes a defined operation to occur. Thus, for example, a control rule may be, but is not limited to, a rule causing a dynamic update and/or modification of a provided message based at least in part on an associated condition.

In various cases, the computer readable medium further includes instructions executable by the processor to provide the message content and the indication of the first priority at a location identified by the recipient indication. Providing information "at a location" is interpreted in its broadest sense to mean any action that causes information to be physically maintained at the location or simply accessible via the location. Thus, the location may be virtual, such as an email address or voicemail address; or physical, such as a storage medium associated with a personal computer or telephone.

In particular cases, the message content is an audio content and the indication of the initial priority is an audio indication. Such audio content may be, but is not limited to, any type of formatted audio. Thus, as just one of many examples, audio content may be a way file. An audio indication may be any audible message indicating a status of the audio content. Thus, as just one particular example, an audio indication may also be a way file. Based on the disclosure provided herein, one of ordinary skill in the art will recognize a variety of audio content, audio indications and/or audio formats that may be utilized in accordance with one or more embodiments of the present invention. In other cases, the message content is a text content and the indication of the priority is a graphical indication. Such a graphical indication may be any indication of priority that may be graphically displayed. Based on the disclosure provided herein, one of ordinary skill in the art will recognize a variety of text message formats, and graphical formats and symbols that may be used in relation to embodiments of the present invention.

Turning to FIG. 1, a flow diagram 100 depicts a method for preparing tiered messages in accordance with one or more embodiments of the present invention. Following flow diagram 100, a request to send a message is received (block 105). The received request includes a message content (block 110), a recipient identification (block 115) and an indication of message priority (block 120). The request to send a message may be received in one of a variety of ways depending upon the message to be sent and the system being used to send the message. Thus, for example, where the system being used to send the message is an email system, the request to send a message may include pressing the send button on the email API (GUI or software). As another example, where the system being used to send the message is a voicemail system, the request to send a message may include recording a voicemail. Based on the disclosure provided herein, one of ordinary skill in the art will recognize a variety of systems and associated requests that may be used to request that a message be sent in accordance with different embodiments of the present invention.

It is next determined whether the received message is to be associated with a tiered priority (block 125). Such a tiered priority may be, but is not limited to, an ability to change a message priority based on a condition, an ability to change the message itself based on the condition, an ability to send the message to alternate recipients based on the condition, combinations of the aforementioned, and/or the like. In some cases, a determination of whether tiered priority is to be used is achieved based on a response to a query presented to a user via a user interface. Where a tiered priority is not desired (block 125), a future control rule is defined that indicates the aforementioned desire (block 180). In some cases, a future control rule defining a non-tiered message may be the default. In some cases, where a future control rule is not defined, it is by default assumed by a recipient that a received message does not include tiered priority. In such cases, the operation of block 180 does not require any action. With the future control rule thus defined (block 180), the message is distributed with the future control rule (block 185).

Alternatively, where a tiered priority is desired (block 125), a recipient for which the control rule will apply is determined (block 130). This may be accomplished, for example, by user selection. In addition, it is determined whether multiple priority indicators are to be used (block 135) and/or whether multiple messages are to be used (block 150) for the message to be distributed in relation to the selected recipient. Use of multiple priority indicators allows a message to be initially distributed with one priority, and upon satisfaction of a condition, the priority may be changed. Use of multiple messages, on the other hand, allows for one message to be initially distributed, and upon satisfaction of a condition, the message may be appended, altered or swapped out for another message.

Where multiple priority indicators are to be used (block 135), a user is queried for a replacement priority indicator and for a condition associated with the replacement priority indicator (block 140). In response, a user indicates the desired priorities and associated conditions (block 145). In one particular case, a user may be presented with a graphical interface displaying one or more radio buttons associated with different priority indicators that can be selected for association with a particular message, and an associated rule entry block. In response to the user interface, the user may select two priorities indicating that one of the priorities is to be used initially, and that the other of the two priorities is to be used when the rule provided in the block associated with the radio button is satisfied. Based on the disclosure provided herein, one of ordinary skill in the art will recognize a variety of user interfaces that may be used to query a user for multiple priorities. At this juncture, it should be noted that while the present invention is discussed as providing an ability to implement two tiers of priorities, it may be possible for a user to set forth three or more priority levels, each with an associated condition.

Where either multiple priority indicators are not desired (block 135) or the user response to a multiple priority query has been received and implemented (block 145), a user is queried to determine whether multiple messages are to be used (block 150). Where multiple messages are to be used (block 150), a user is queried for an update message (block 155), and a response including the update message is received from the user (block 160). In one particular case, a user may be presented with a graphical interface displaying a text block into which the user may type text content, or an audio message requesting that the user record an updated audio content. In addition, a rule request is provided in relation to the content request. The rule request asks the user to identify the conditions under which the update message will be used, and how the message is to be used. Thus, as just one example, a user may provide an alternative text message that is to be displayed to a recipient only if the recipient has not already opened the initial message. Further, the user may define that the update message is to replace the earlier message, while in other cases the user may indicate that the update message is to be appended to or otherwise provided in relation to the previously sent message. Based on the disclosure provided herein, one of ordinary skill in the art will recognize a variety of alternative messages and/or rules (conditions) that may be defined to control use of the alternative message. At this juncture, it should be noted that while the present invention is discussed as providing an ability to implement two messages, it may be possible for a user to set forth three or more messages, each with an associated condition.

Based on the responses received from the user, a comprehensive future control rule may be constructed that defines the implementation of multiple priorities and/or multiple messages (block 165). Thus, for example, in the case where two messages are to be sent, the first with a high priority and the second with a low priority, the comprehensive future control rule indicates the aforementioned condition. It is then determined if multiple recipients are to be defined in relation to the particular message (block 170). Where another recipient is to be included (block 170), the next recipient is selected (block 175) and the processes of blocks 135-170 are repeated for this selected recipient. Thus, the method set forth in flow diagram 100 not only provides an ability to define multiple priorities for a given message and multiple messages associated with different priorities, it allows for this definition to be expanded to account for each recipient of the message individually. Alternatively, where no additional recipients are to be included (block 170), the message(s) is distributed with the comprehensive control rule to each of the recipients (block 185). This may include distributing message(s) to each recipient with a comprehensive future control rule tailored to each of the recipients.

As will be appreciated by one of ordinary skill in the art based on the preceding discussion of FIG. 1, the method may be used to provide messages with an ability to change the priority indicator of the message upon satisfaction of a defined condition. As another example, the method may be used to define a replacement message upon satisfaction of the condition. As yet another example, the method may be used to send a message to an alternative recipient upon satisfaction of the condition. Further, it will be appreciated that the method may be used to provide messages combining one or more of the aforementioned scenarios. Based on the disclosure provided herein, one of ordinary skill in the art will recognize a myriad of options for tiered control of messages that may be implemented using one or more embodiments of the present invention.

Figure 2:
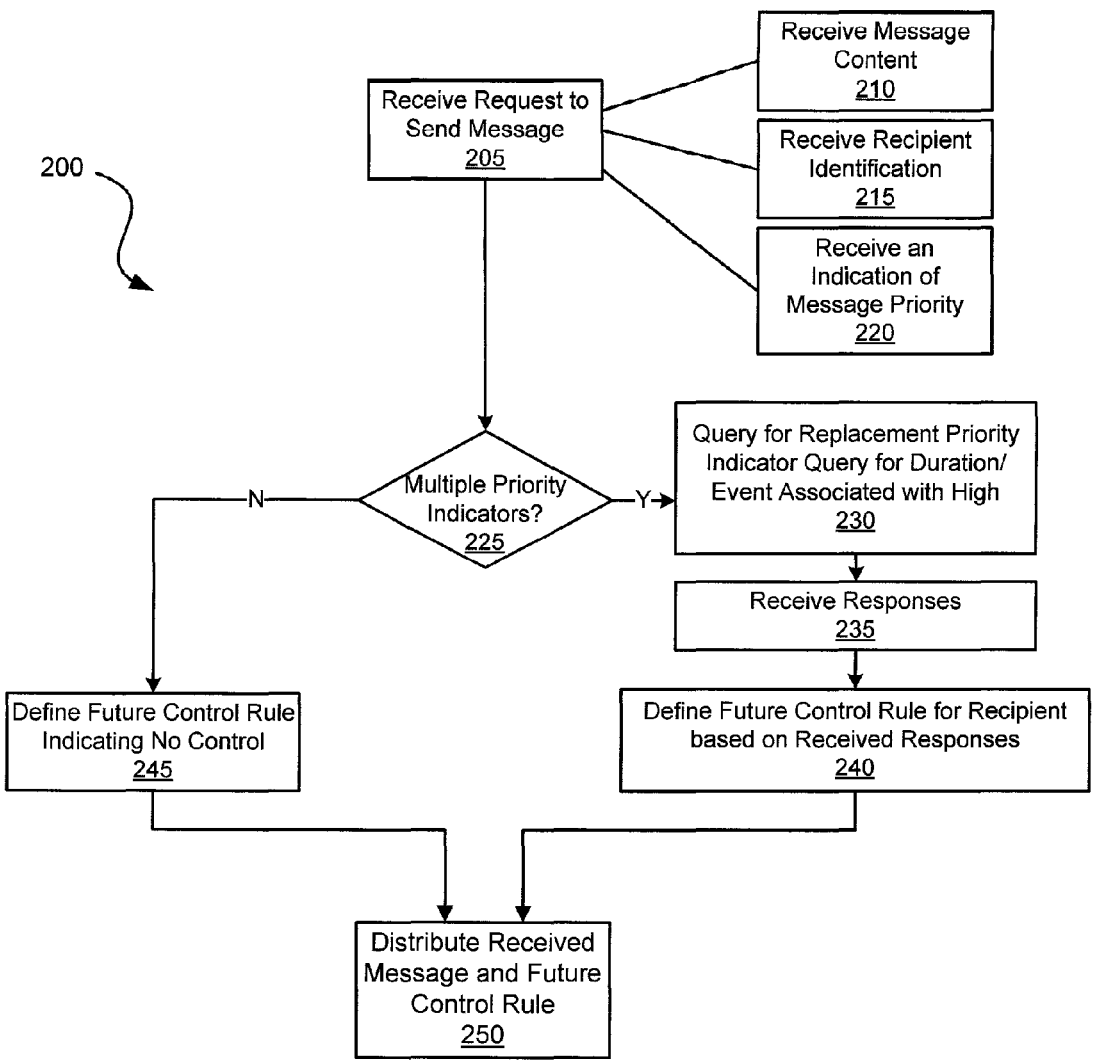
FIG. 2 is a flow diagram illustrating a method for preparing a multiple priority message in accordance with various embodiments of the present invention.

Turning to FIG. 2, a flow diagram 200 depicts a method for preparing only a multiple priority message in accordance with various embodiments of the present invention. Following flow diagram 200, the received request includes a message content (block 210), a recipient identification (block 215) and an indication of message priority (block 220). In addition, it is determined whether the received message is to be associated with a tiered priority (block 225). Where a tiered priority is not desired (block 225), a future control rule is defined that indicates the aforementioned desire (block 245). In some cases, a future control rule defining a non-tiered message may be the default. In some cases, where a future control rule is not defined, it is by default assumed by a recipient that a received message does not include tiered priority. In such cases, the operation of block 245 does not require any action. With the future control rule thus defined (block 245), the message is distributed with the future control rule (block 250).

Alternatively, where a tiered priority is desired (block 225), a user is queried for a replacement priority indicator and for a condition associated with the replacement priority indicator (block 230). In response, a user indicates the desired priorities and associated conditions (block 235). Based on the response received from the user, a comprehensive future control rule may be defined that defines the implementation of multiple priorities and/or multiple messages (block 240). Then, the message is distributed with the comprehensive control rule to the indicated recipient (block 250).

Figure 3:
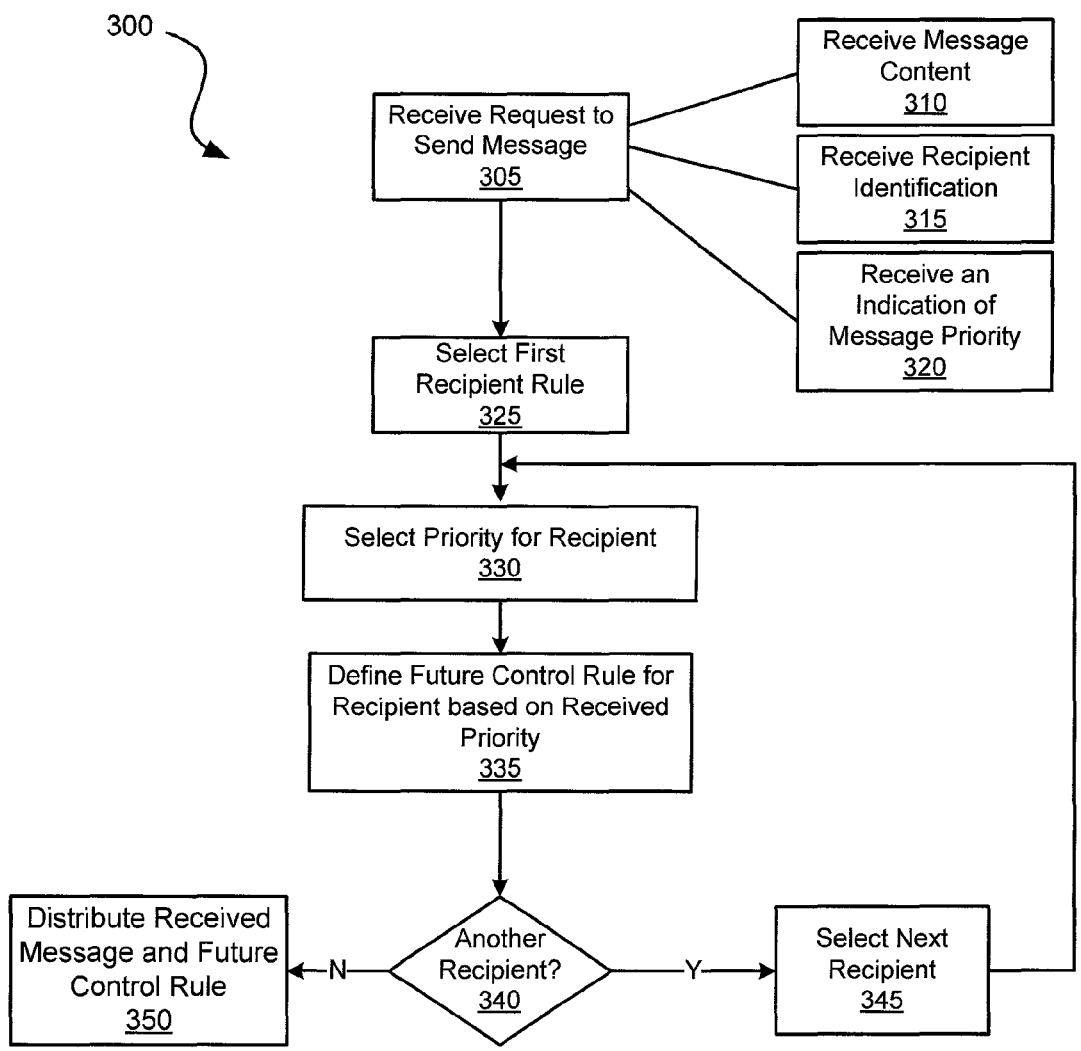
FIG. 3 is a flow diagram illustrating a method for preparing a multiple recipient/multiple priority message in accordance with some embodiments of the present invention.

Turning to FIG. 3, a flow diagram 300 depicts a method for preparing a multiple recipient/multiple priority message in accordance with some embodiments of the present invention. Following flow diagram 300, a request to send a message is received (block 305). The received request includes a message content (block 310), a recipient identification (block 315) and an indication of message priority (block 320). In addition, one of the recipients to which the message will be distributed is selected for definition of a future control rule specific to that recipient (325). A priority associated with the message that is to be conveyed to the selected recipient is identified (block 330). Based on the defined priority (block 335), a future control rule is defined that is particular to the selected recipient (block 335). It is then determined whether rules are to be defined for another recipient (block 340). Where no recipients remain for definition (block 340), the message is distributed with the comprehensive control rule to each of the recipients (block 185). Alternatively, where another recipient is to be included (block 340), the next recipient is selected (block 345) and the processes of blocks 330-340 are repeated for this selected recipient. As will be appreciated by one of ordinary skill in the art based on the preceding discussion of FIG. 3, the method may be used, for example, to provide the same message to multiple recipients, but with differing priority indications provided to each of the recipients.

Figure 4:
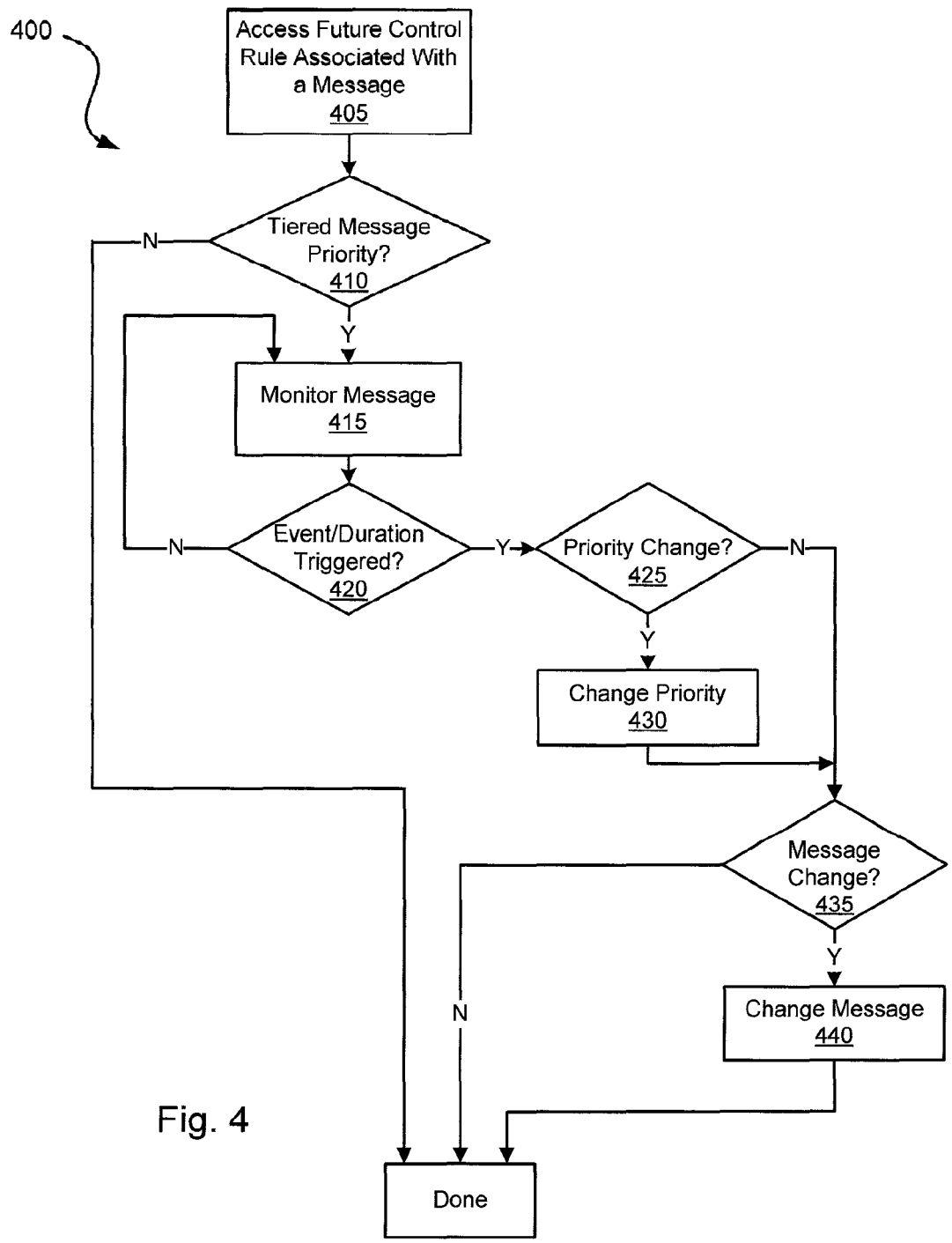
FIG. 4 is a flow diagram illustrating a method for utilizing a multi-tiered message in accordance with various embodiments of the present invention.

Turning to FIG. 4, a flow diagram 400 depicts a method for utilizing a multi-tiered message in accordance with various embodiments of the present invention. Following flow diagram 400, a message is received that is associated with a future control rule and the future control rule is accessed (block 405). Based on the future control rule, it is determined whether the message includes some form of tiered priority as was discussed above in relation to FIG. 1 (block 410). Where tiered priority is not indicated by the future control rule (block 410), the process completes as the message has been delivered to the recipient and no future control is necessary.

Alternatively, where tiered message priority is indicated (block 410), the message is monitored extending into the future (block 415). This monitoring includes identifying one or more conditions associated with the message and maintaining the message (or some pointer associated with the message) in a monitor queue. While the message remains in the monitoring queue, the one or more conditions associated with the message are monitored to determine whether they are satisfied (block 420). Thus, for example, where the condition is a time duration, it is determined whether the duration has completed. Alternatively, where the condition is an event or a fixed point in time, it is determined whether the event or the fixed point in time has passed. Again, based on the disclosure provided herein, one of ordinary skill in the art will recognize a variety of conditions and monitoring appropriate thereto that may be used in relation to embodiments of the present invention.

Once the condition has been satisfied (block 420), it is determined whether the condition results in a priority change (block 425) and/or a message change (block 435). This determination can be made by accessing the future control rule associated with the message. Where a priority change is to be implemented (block 425), the priority associated with the message is updated to reflect the post condition priority indicated by the future control rule (block 430). Where either no priority change is required (block 425) or the directed priority change has been completed (block 430), it is determined whether a message change is directed by the future control rule (block 435). Where no message change is called for (block 435), the process completes. Otherwise, where a message change is indicated (block 435), the update message associated with the future control rule is provided (block 440). As previously discussed, providing the update message may include, but is not limited to, replacing the previous message with the update message, appending the update message to the previous message, or simply providing the update message in addition to the previously provided message. Once the update message is provided, the process completes. At this juncture, it should be pointed out that where multiple conditions are used in relation to a given message, the process would not complete until all of the conditions have been satisfied. Process completion thus indicates that all conditions have been completed and that the message may be eliminated from the monitoring queue discussed above in relation to block 415.

Turning now to FIG. 5, a depiction is provided of an exemplary multi-tiered message formed and utilized using one or more systems and methods in accordance with embodiments of the present invention. Turning to FIG. 5a, an initial message 500 includes a message content 503, two recipient indicators 501, 502, and two priority indicators 505, 506 associated with respective ones of the recipient indicators. In particular, initial message 500 is initially provided to both Recipient A 501 and Recipient B 502, but is marked high priority 505 when presented to Recipient A 510 and as normal priority 506 when presented to Recipient B 502. At some point, a condition associated with initial message 500 is satisfied causing initial message 500 to be modified to a post condition message 510 of FIG. 5b. In this case, the priority of initial message 500 is reduced for Recipient A 501 to indicate only a normal priority 507. Alternatively, satisfaction of the associated condition may cause initial message 500 to be modified to that of another post condition message 520 depicted in FIG. 5c. Also, the priority of initial message 500 is increased for Recipient B 502 to indicate a high priority 508 upon completion of the condition.

Figure 5A:
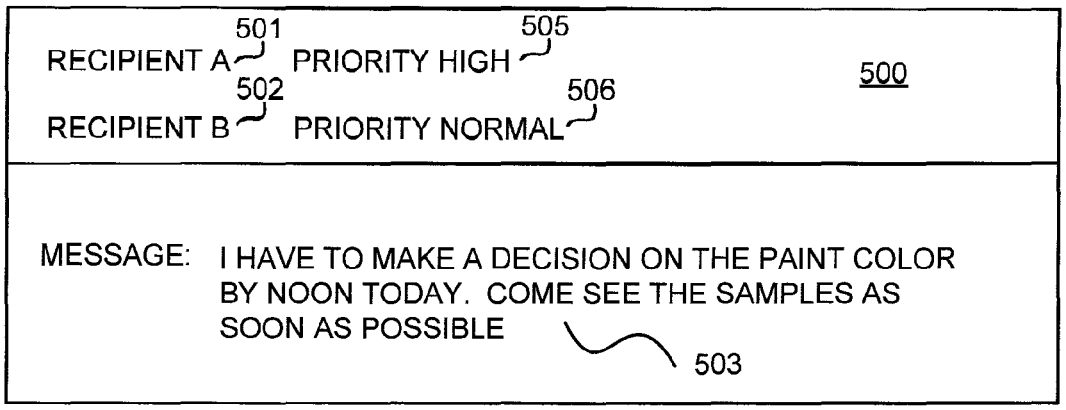
FIGS. 5A-5F depict an exemplary display of an exemplary multi-tiered message formed and utilized using one or more systems and methods in accordance with embodiments of the present invention.
Figure 5B:
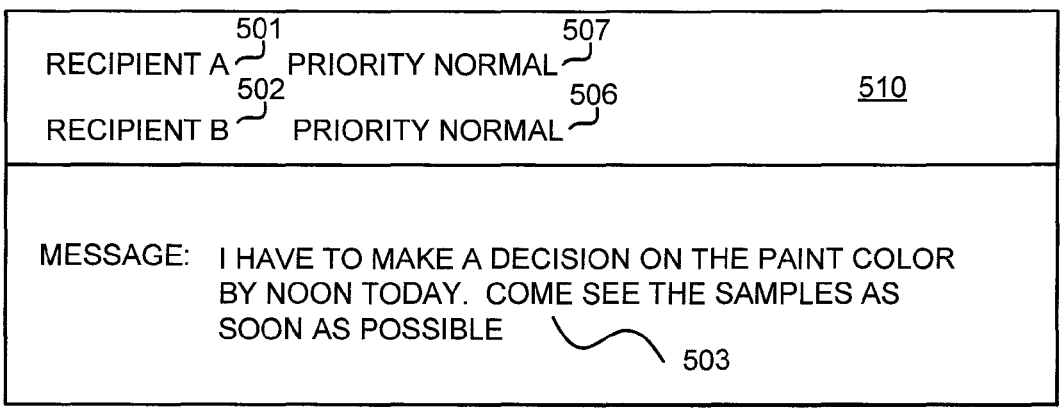
Figure 5C:
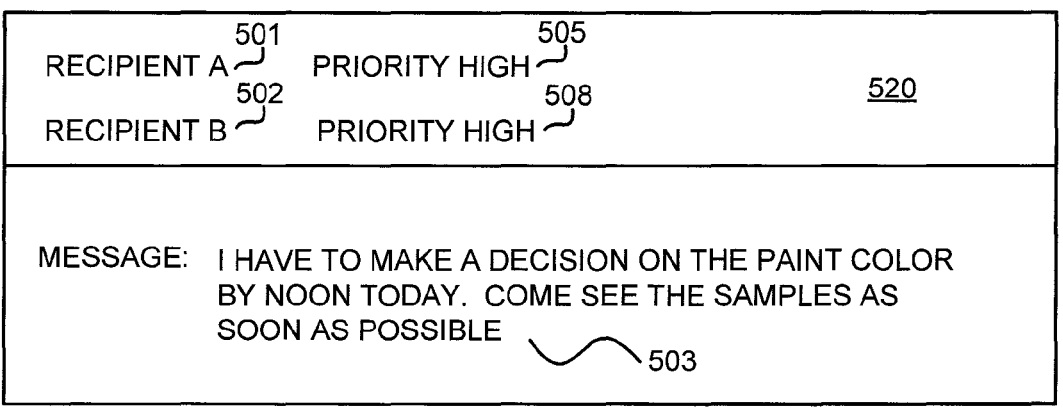
Figure 5D:
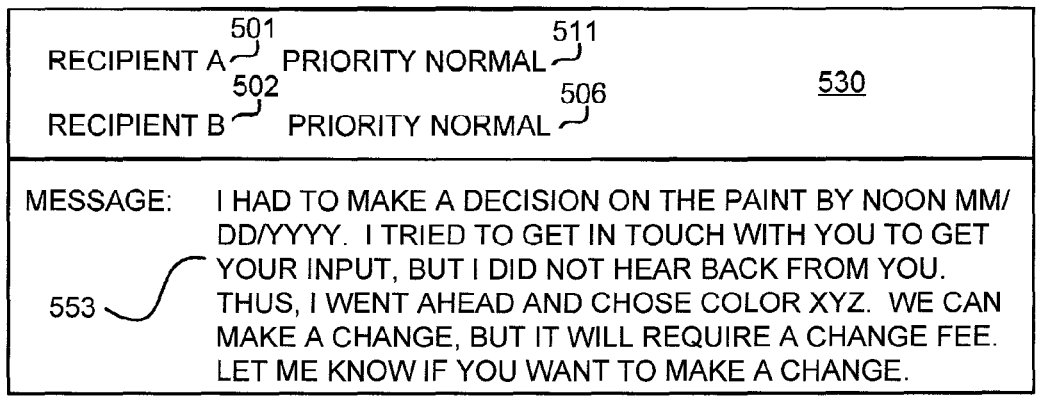
Figure 5E:
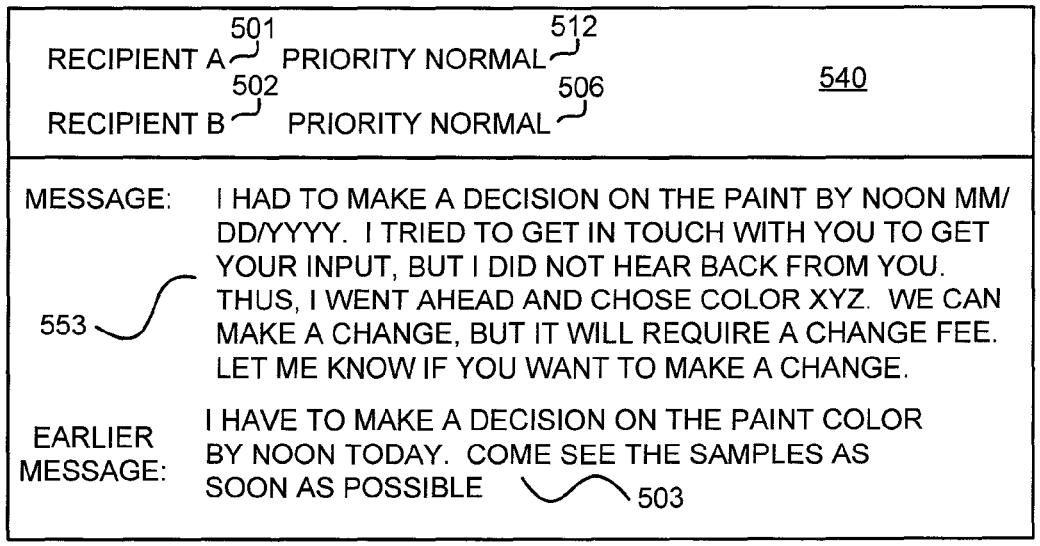
Figure 5F:
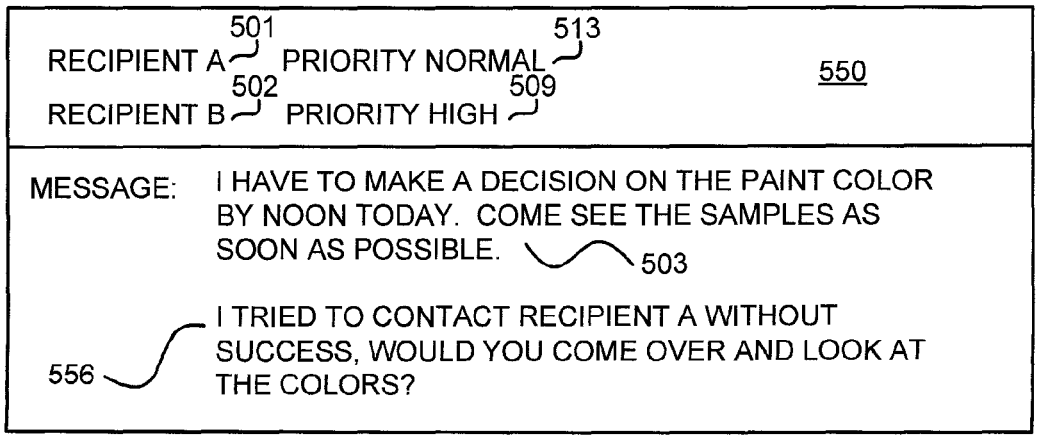

Turning to FIG. 5d, another alternative post condition message 530 is depicted. Upon satisfaction of the condition, the priority associated with Recipient A 501 is reduced to a normal priority 511, and message 503 is replaced with an updated message content 553 indicating that the process discussed in message content 503 has passed. FIG. 5e provides yet another alternative post condition message 540. Upon satisfaction of the condition, the priority associated with Recipient A 501 is reduced to a normal priority 512, and updated message content 553 is appended to message content 503. FIG. 5f depicts yet another alternative post condition message 550 that includes an updated message indicating to one of the recipients that the other recipient failed to respond. In particular, upon satisfaction of the condition, the priority associated with Recipient A 501 is reduced to a normal priority 512 and the priority associated with Recipient B is increased to high priority 509. In addition, an updated message content 556 is appended to message content 503. Again, it should be noted that the messages and messaging scenarios of FIG. 5 are merely exemplary, and that based on the disclosure provided herein, one of ordinary skill in the art will recognize a myriad of other messages and/or messaging scenarios that may be achieved using one or more embodiments of the present invention.

Figure 6A:
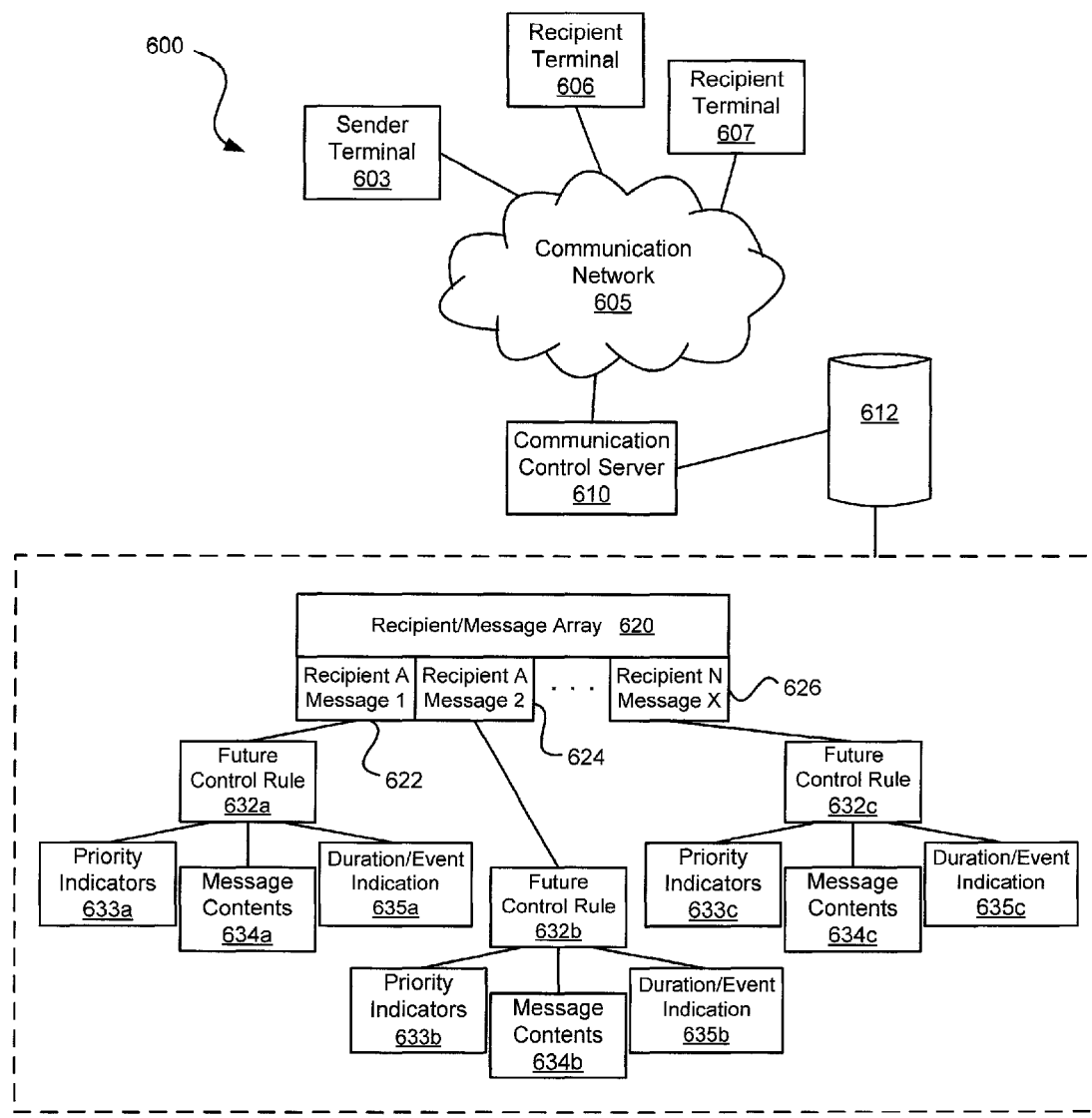
FIGS. 6A-6C depict various systems for implementing multi-tiered messages in accordance with various embodiments of the present invention.

Turning to FIG. 6, various systems for implementing multi-tiered messages in accordance with various embodiments of the present invention are depicted. FIG. 6a shows a system 600 including a communication control server 610 electrically coupled to a computer readable medium 612. Computer readable medium 612 includes information and instructions that allow communication control server 610 to receive requests to send messages, to receive future control rules in relation to the messages, and to monitor conditions associated with the messages.

Communication control server 610 is communicably coupled to at least one sender terminal 603 and two or more recipient terminals 606, 607 via a communication network 605. Communication network 605 may be any network capable of transmitting information between sender terminals 603, recipient terminals 606, 607 and communication control servers 610. Thus, for example, communication network 605 may be a PSTN network, the Internet, a local area network, a wide area network, a voice over IP network, combinations of the aforementioned and/or the like. Communication control server 610 may be any computer or other network element capable of receiving messages, monitoring conditions and distributing message portions in accordance with a future control rule associated with a given message. In the depicted system, sender terminal 603 and recipient terminals 606, 607 may be any terminal capable of preparing and/or receiving messages. Thus, for example, the aforementioned terminals may be, but are not limited to, telephones and personal computers.

In operation, a message (e.g., a message as described above in relation to FIG. 1) is prepared at sender terminal 603 and provided to communication control server 610. In turn, communication control server 610 includes the message in one of a plurality of message arrays 620 each associated with recipient terminals 606, 607 that are serviced by communication control server 610. Message array 620 includes a number of messages 622, 624, 626 that are being monitored in accordance with associated future control rules 632. Future control rules 632 each indicate one or more priority indicators 633, one or more message contents 633, and one or more conditions 635 as previously discussed in relation to FIG. 1.

Upon receiving a particular message, communication control server 610 determines if there is a future control rule associated with the message that requires ongoing monitoring. Where no future monitoring is required, the message is simply delivered to the indicated recipient(s). Where, on the other hand, the message does require ongoing monitoring, the initial message is delivered to the indicated recipient(s) with the message content and priority indicators defined for the particular recipients. Communication control server 610 then monitors the conditions associated with the message to determine whether the conditions have been satisfied. Once it is determined that a condition has been satisfied, the message content and/or priority indicator is updated as directed by the future control rule. The message is maintained in message array 620 until all of the conditions for a particular message have been satisfied and there no longer remains a need to continue monitoring the message progress.

Figure 6B:
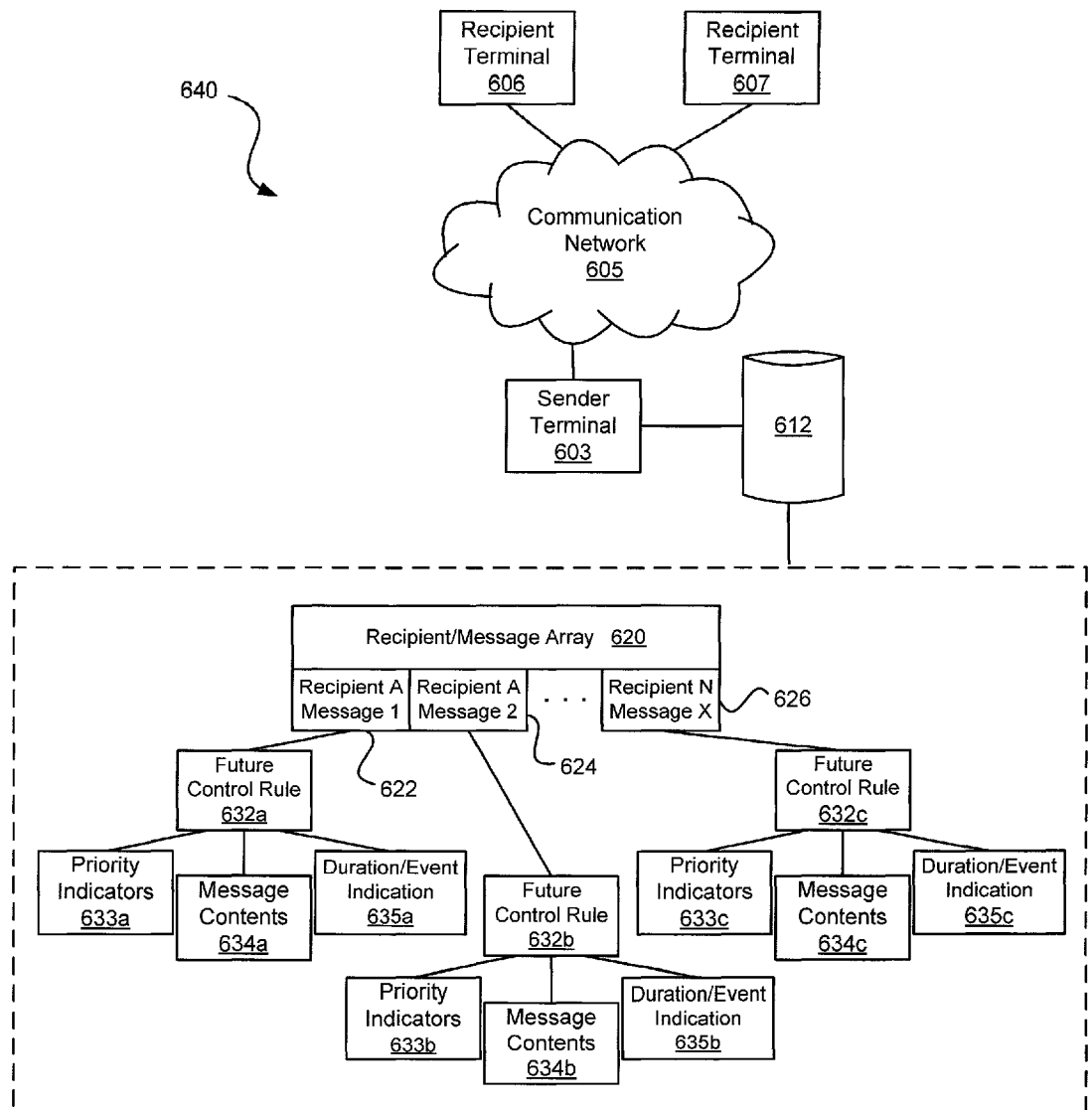
Figure 6C:
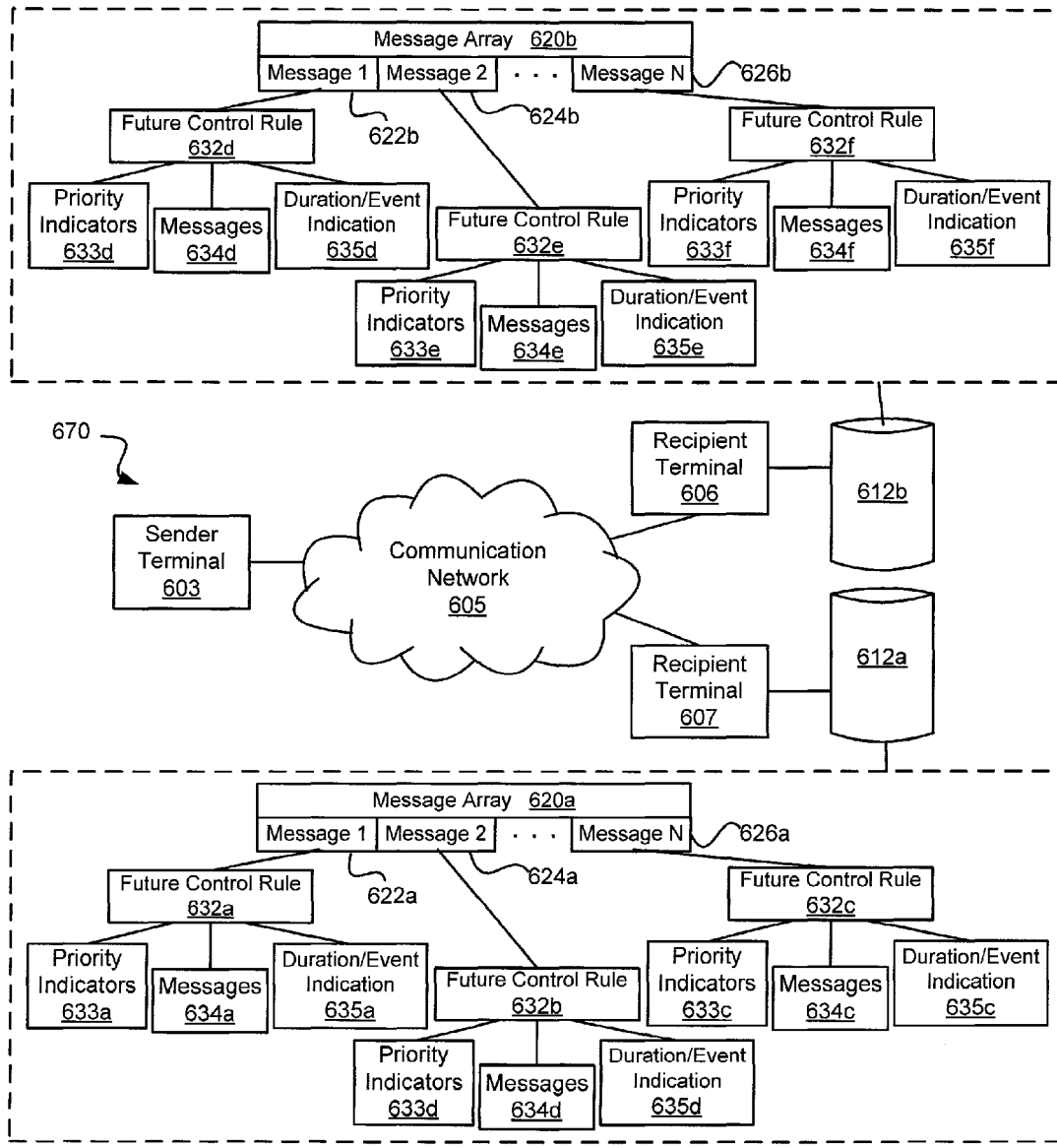

Turning to FIG. 6b, an alternative system 640 is depicted. System 640 includes substantially the same functionality as that discussed in relation to system 600 except that the operation of message monitoring in accordance with future control rules is implemented as part of sender terminal 603. Thus, the functionality of sender terminal 603 is augmented to include that of communication control server 610 of FIG. 6a. Turning to FIG. 6c, yet another alternative system 670 is depicted. Similar to system 640, system 670 includes substantially the same functionality as that discussed in relation to system 600 except that the operation of message monitoring in accordance with future control rules is implemented as part of recipient terminals 606, 607. In such cases, the functionality of recipient terminals 606, 607 is augmented to include that of communication control server 610 of FIG. 6a.

In conclusion, the present invention provides novel systems, devices, methods and arrangements for providing and updating electronic communications. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A messaging system, the system comprising:
a processor;
a computer readable media readable by the processor, wherein the computer readable media includes instructions executable by the processor to:
receive a message, wherein the message includes a message content, a condition, and a future control rule, wherein the condition and future control rule are associated with the message;
deliver at least the message content to a recipient mailbox; and
apply the future control rule exclusively to the message upon satisfaction of the condition, wherein the future control rule changes the message content or priority of the message wherein the message content is a first message content, wherein the message includes a second message content, and wherein applying the future control rule to the message causes the second message content to be provided; and wherein the recipient mailbox is a first recipient mailbox, and wherein applying the future control rule to the message also causes the message content to be delivered to a second recipient mailbox.

2. The system of claim 1, wherein the delivered message content indicates a first priority, wherein applying the future control rule to the delivered message content changes the first priority to a second priority, and wherein the second priority is different from the first priority.

3. The system of claim 2, wherein the computer readable media further includes instructions executable by a processor to:
receive the first priority;
associate the first priority with the message;
receive the second priority; and
associate the second priority with the message.

4. The system of claim 1, wherein application of the future control rule to the message is done by a processor based machine, and wherein the processor based machine is selected from a group consisting of: a recipient terminal, a sender terminal, and a communication control server.

5. The system of claim 1, wherein the condition is selected from a group consisting of: a duration and an event.

6. The system of claim 1, wherein the computer readable media further includes instructions executable by a processor to:
receive the first message content;
associate the first message content with the message;
receive the second message content; and
associate the second message content with the message.

7. The system of claim 1, wherein the message content is an audio content, and wherein the recipient mailbox is a voice-mail box.

8. The system of claim 1, wherein the message content is a text content, and wherein the recipient mailbox is an email box.

9. The system of claim 1, wherein the recipient mailbox is a first recipient mailbox, wherein the message delivered to the first recipient mailbox indicates a first priority, and wherein the computer readable media further includes instructions executable by a processor to:
deliver the message to a second recipient mailbox, wherein the message delivered to the second recipient mailbox indicates a second priority.

10. A method for messaging using multi-tiered messages, the method comprising:
- a processor receiving a message, wherein the message includes: a message content, a condition and a future control rule exclusively associated with the message, wherein the condition and future control rule are associated with the message;
- the processor distributing at least the message content to a recipient mailbox; and
- the processor applying the future control rule to the message upon satisfaction of the condition, wherein the future control rule changes the message content or priority of the message wherein the message content is a first message content, wherein the message includes a second message content, and wherein applying the future control rule to the message causes the second message content to be provided; and wherein the recipient mailbox is a first recipient mailbox, and wherein applying the future control rule to the message also causes the message content to be delivered to a second recipient mailbox.

11. The method of claim 10, wherein the delivered message content indicates a first priority, wherein applying the future control rule to the message changes the first priority to a second priority, and wherein the second priority is different from the first priority.

12. The method of claim 11, wherein the method further comprises:
- receiving the first priority;
- associating the first priority with the message;
- receiving the second priority;
- associating the second priority with the message; and
- wherein the first priority, the second priority and the message content are received contemporaneously.

13. The method of claim 11, wherein the message content is a text content, wherein the first priority is associated with a graphical indication, and wherein the method further comprises:
- displaying the text content and the graphical indication.

14. The method of claim 13, wherein changing the first priority to the second priority includes causing the graphical indication not to display.

15. The method of claim 10, wherein the processor is associated with one from a group consisting of: a recipient terminal, a sender terminal, and a communication control server.

16. The method of claim 10, wherein the condition is selected from a group consisting of: a duration and an event.

17. The method of claim 10, wherein providing the second message content includes delivering the second message content.

18. The method of claim 10, wherein providing the second message content includes displaying the second message content.

19. The method of claim 10, wherein the method further comprises:
- receiving the first message content;
- associating the first message content with the message;
- receiving the second message content;
- associating the second message content with the message; and
- wherein the first message content, the second message content are received contemporaneously.

20. The method of claim 10, wherein the message content and recipient mailbox are selected from a group consisting of: an audio content and a voicemail box; and a text and an email box.

* * * * *

UNITED STATES PATENT AND TRADEMARK OFFICE
CERTIFICATE OF CORRECTION

| | | |
|---|---|---|
| PATENT NO. | : 8,005,196 B1 | Page 1 of 1 |
| APPLICATION NO. | : 11/469432 | |
| DATED | : August 23, 2011 | |
| INVENTOR(S) | : Sreerupa Das et al. | |

It is certified that error appears in the above-identified patent and that said Letters Patent is hereby corrected as shown below:

Title page Item (75) Inventors, please change "Ashis Malty" to --Ashis Maity-- therein.

Signed and Sealed this
Twentieth Day of March, 2012

David J. Kappos
*Director of the United States Patent and Trademark Office*